Aug. 8, 1939.　　　　W. HARGRAVE　　　　2,168,673
AUTOMOBILE SIGNAL
Filed Feb. 5, 1936
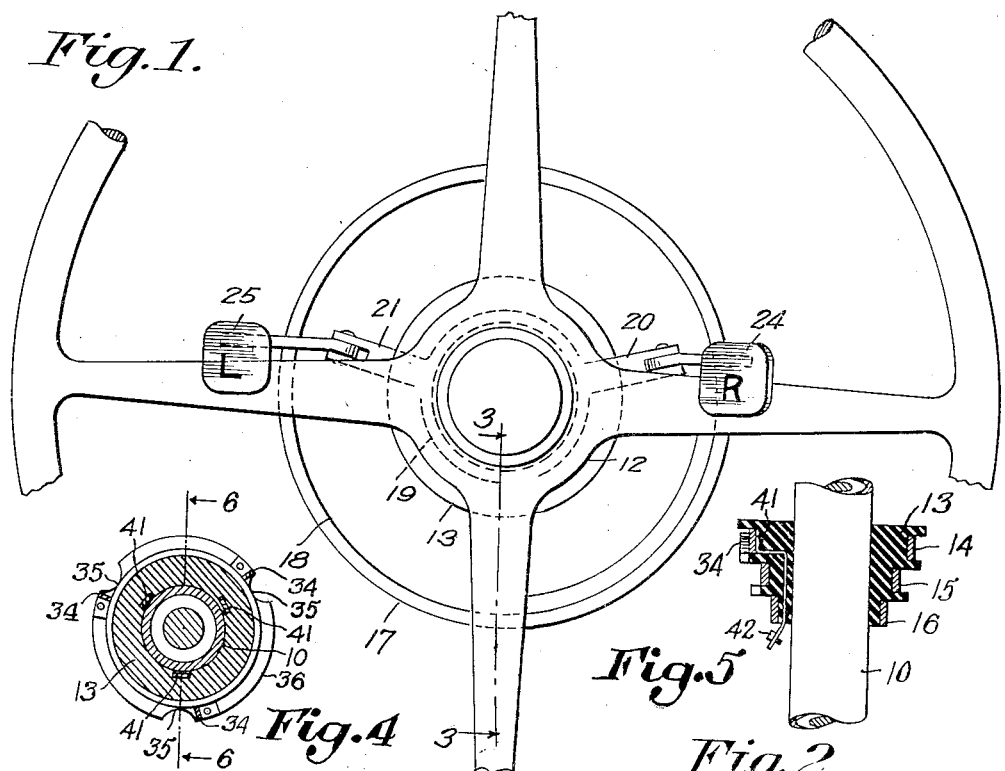
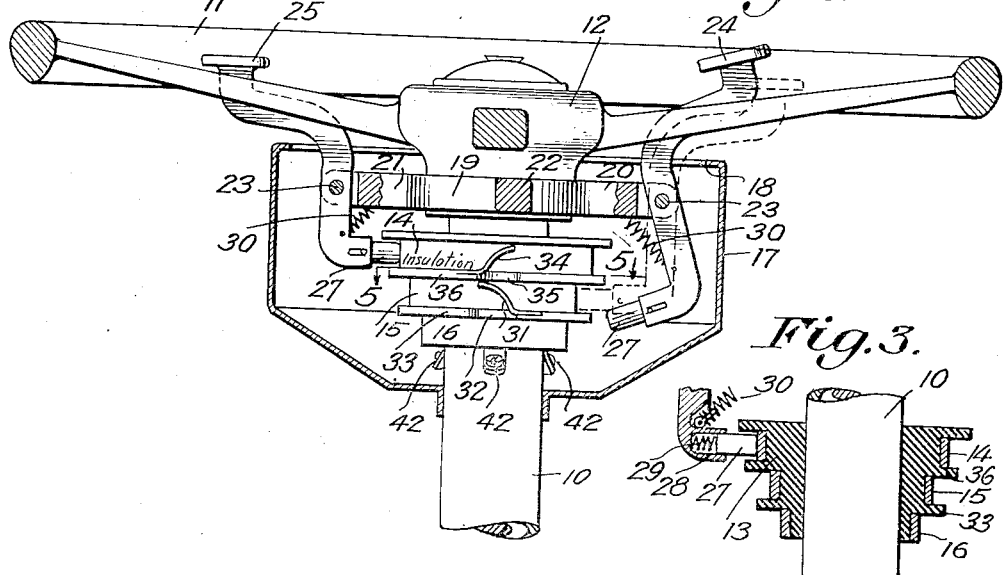
William Hargrave
INVENTOR
BY Victor J. Evans & Co.
ATTORNEYS Patented Aug. 8, 1939

2,168,673

UNITED STATES PATENT OFFICE 2,168,673

AUTOMOBILE SIGNAL

William Hargrave, Hillsboro, Oreg.

Application February 5, 1936, Serial No. 62,542

1 Claim. (Cl. 200—59)

This invention relates to automobile signals and has for an object to provide a novel switch whereby the driver may produce a visible signal prior to turning the vehicle, to indicate his intention, the switch automatically opening the signal light circuit when the turn is wholly or partly completed.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a plan view of a steering wheel switch constructed in accordance with the invention.

Figure 2 is a cross sectional view through the steering wheel switch shown in Figure 1 with parts in elevation.

Figure 3 is a detail cross sectional view showing the contact drum with the left turn signal lever in engagement therewith.

Figure 4 is a cross sectional view taken on the line 5—5 of Figure 2 showing the notches in the center flange of the drum for automatically moving the right and left turn levers to circuit breaking position.

Figure 5 is a cross sectional view taken on the line 6—6 of Figure 5 showing the means for connecting the contact rings of the drum to the circuit wires.

Referring now to the drawing in which like characters of reference designate similar parts in the various views, 10 designates a steering column, and 11 a steering wheel, the latter being secured to the steering post by means of a collar 12. In carrying out the invention a drum 13 of insulating material is fixed to the steering column and is equipped with stepped grooves in which three annular metal contact rings 14, 15, and 16 are disposed. The drum is stationary and is enclosed by a housing 17 which is provided with a flange 18 at the top within the inner circumference of which the signal levers rotate as a unit with the steering wheel.

To mount the signal levers a collar 19 is fixed to the steering wheel collar 12 and rotates as a unit with it. The collar 19 is provided with radially disposed arms 20 and 21, which are bifurcated at the ends to pivotally receive, as shown at 23, levers 24 and 25, having flat grips at the ends displaying letters respectively R, for right turn and L for left turn, as best shown in Figure 1.

Each lever is somewhat S-shaped in contour and each is provided in the lower end with a plunger 27 which is slidably fitted in a recess 28 in the lever and is spring pressed outwardly by a helical spring 29 disposed in the recess, as best shown in Figure 3. The plunger of the left turn lever 24 is adapted to have wiping contact with the upper contact ring 14, and the plunger of the right turn lever 25 is adapted to have wiping contact with the intermediate contact ring 15.

Each turn lever 24 and 25 is normally held in neutral position by a controlling spring 30 in which position the plunger 27 is disposed below its associated contact ring. When the upper end of either lever is depressed its plunger rides over the edge of the contact drum and is moved inwardly until it enters the respective groove of the drum whereupon the plunger is urged outwardly by its spring into wiping engagement with the contact ring and is held in this set position by the wall of the groove. When the lever is in this circuit closing position, the corresponding signal light will be energized. The right turn lever 24 or the left turn lever 25 will be depressed by the driver to indicate his intention to make a corresponding turn, just prior to making the turn. At the beginning of the turn and while the turn is being made the plunger of the selected lever rides upon the associated contact ring and maintains a closed circuit through the associated signal lamp.

An arcuate leaf spring 31 is disposed transversely across the contact ring 15, and below the spring a notch 32 is formed in the edge 33 of the drum. During the progress of a right turn, the plunger 27 of the right turn lever will ride over the spring 31 but when the driver reverses his direction to straighten out the vehicle on its new course the plunger 27 will be directed by the spring 31 downwardly through the notch 32 and pass below the edge 33. Thereupon the lever 24 is immediately returned to neutral position by its spring 30 thereby opening the right turn signal light circuit. An arcuate leaf spring 34 is disposed transversely across the contact ring 14 and directs the plunger 27 of the left turn lever 25 downwardly through a notch 35 in the edge 36 of the drum to permit the left turn lever to be returned to neutral position by its controlling spring to open the left turn signal light circuit after a left turn has been completed.

The contact rings are provided with respective connector bars 41, best shown in Figures 4 and 5, which are imbedded in the drum 13 and are equipped with screws 42 by means of which circuit wires may be attached to the contact rings.

Figure 4, it will be pointed out, also shows that a plurality of springs 34 and notches 35 are disposed around the periphery of the contact drum. The purpose of this, of course, is to provide for cutting off the left turn signal without making it necessary to turn the steering wheel through a 360 degree angle as would be the case were only one spring and notch utilized. Duplication of the spring 31 and notch 32 is also made in like manner and for a similar purpose, that is, to permit of the right turn signal being cut off without the steering wheel being turned through an arc of 360 degrees.

Since the operation of the signal switch has been described as the description of the parts progressed, it is thought that the construction and operation of the invention will be fully understood without further explanation.

What is claimed is:

In a signal system for motor vehicles, a switch comprising an insulating collar adapted to be fixed to the steering column and provided with stepped circumferential grooves, an insulating collar adapted to be secured to the steering post and rotate as a unit therewith, a contact ring on the bottom wall of each groove, a plurality of signal levers pivoted on the second named collar and of such length as to extend at the free ends into respective ones of said grooves, a spring pressed plunger on each lever normally disposed below the respective contact rings and adapted to ride into the respective groove and be held by the wall thereof in circuit closing position in wiping contact with the respective contact ring, a deflecting member carried by the first named collar and extending across the bottom of a respective one of said stepped grooves from one wall of the groove to the opposite wall of the groove for pivotally moving the respective lever and permit the respective spring pressed plunger to be moved transversely off of the respective contact ring to open circuit position, there being a notch in the collar permitting said spring pressed plunger to be moved bodily out of the groove by the deflector member to normal position, and a controlling spring for returning the lever to neutral position and holding the same out of the groove after it has passed through the notch.

WILLIAM HARGRAVE.